United States Patent Office 3,171,781
Patented Mar. 2, 1965

3,171,781
PROCESS FOR TREATING AIR SAC DISEASE
Mervyn Joseph Lobel, Great Neck, N.Y.
(25 W. 54th, New York, N.Y.)
No Drawing. Filed Aug. 23, 1960, Ser. No. 51,288
4 Claims. (Cl. 167—53.1)

The present invention relates to the treatment of air sac disease in poultry and other domesticated fowl.

Air sac disease, particularly as experienced in poultry, appears to be highly contagious and results suddenly in large flocks, causing death and destruction of large number of fowl in a very short time due to swelling and enlargement of the air sac, with resultant loss in appetite and disability of the fowl and their death due either to lack of nourishment or their susceptibility to other diseases, viruses or micro-organisms.

It is among the objects of the present invention to provide a simple and effective method for the treatment of air sac disease which will result in relatively short time of recovery of the fowl from air sac disease and the return of the fowl to their normal feeding habits, with loss of abnormal swelling, even though relatively minute amounts of the compound or composition be administered or taken into the fowl's digestive tract during a short time, not exceeding 24 to 72 hours.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

It has surprisingly been found that the addition of relatively minute amounts of an additive composition of vitamin A and guaiacol, when added to chicken feeds, will overcome the effects of air sac disease and result in a speedy cure of the fowl from such disease within a period of 24 to 40 hours and generally in a period of less than 72 hours.

Vitamin A and guaiacol are preferably used in about equal proportions and mixed in small quantity with corn meal or other poultry feed compositions.

It is also possible to include camphor and iodine or sodium or potassium iodide in about the same amounts as guaiacol.

Oil of eucalyptus may also be included in similar amounts.

For example it is possible to combine together about 20 to 300 parts of vitamin A, about 3 to 50 parts of iodine, 33 to 200 parts of camphor, 33 to 200 parts of oil of eucalyptus, and 33 to 200 parts of guaiacol.

This composition is most effectively used with admixture of corn meal or other finely divided cereal.

The finely divided mixture may be used as a surfacing or coating upon poultry feed pellets.

The composition may also be included within the pellets of the feed, as well as surfaced in finely divided form upon the outside of the feed pellets.

Furthermore, the mesh division of the additive composition should range in the order of about 100 to 1,000 mesh, as contrasted to the pellets, which may range from 4 to 10 mesh.

To assure uniform distribution, the powdered additive composition is desirably incorporated with the pelleted feed in rolling and mixing processes so that the additive will be distributed in finely divided discrete flakes or particles over the surfaces of the feed pellets.

It may also be desirable to utilize adhesive which will assure adherence of the additive composition to the pellets, which adhesives can be gum emulsions such as gum acacia or gum tragacanth, or even vegetable or fish oil used as a vitamin A carrier.

As an example of a satisfactory additive composition:

| Ingredient | Parts by Weight | Range |
| --- | --- | --- |
| Vitamin A | 1.112 | 0.2224 to 2.78. |
| Iodine | 0.166 | 0.033 to 0.5. |
| Camphor | 1.33 | 0.333 to 2. |
| Oil of Eucalyptus | 1.33 | 0.333 to 2. |
| Guaiacol | 1.33 | 0.333 to 2. |

WHERE CHLORPROMAZINE IS INCLUDED, IT SHOULD BE INCLUDED IN THE FOLLOWING PROPORTIONS

| Chlorpromazine | 0.17 | 0.0033 to .25. |
| --- | --- | --- |

In addition, 100 to 500 parts by weight of corn meal may be mixed with the additive composition. The corn meal will serve as a carrier and it may be replaced by other inert or edible carriers, such as charcoal, chalk, or even liquids such as glycerin or water, in which the composition may be dissolved or dispersed or emulsified.

To make up the above combination the iodine is triturated with the camphor and then the oils and vitamin A are slowly added and an emulsion of water and gum acacia is added.

The additive composition may be incorporated with the protective film forming materials to protect it against atmospheric influences, as by including paraffin or other protective waxy materials which are inert to the ingredients of the additive composition.

The finished mixture may be added to the corn meal.

Other finely divided cereals or edible or inedible carriers may be mixed in with the above additive composition in amounts ranging from equal parts in weight up to 10 to 50 parts by weight for each part by weight of the above composition.

Small amounts of vitamin E or hydroquinone may also be included in amounts ranging from 10,000 to 100,000 units, and vitamin B may also be included in a range of 5,000 to 20,000 units.

The essential combination of vitamin A and guaiacol combined with the pellets is most effective with air sac disease as it occurs in domesticated chickens, ducks, geese, and turkeys.

The additive composition apparently improves the ability of the poultry to overcome the debilitating effects of the disease and the swelling of the air sac which accompanies the disease.

The additive composition is preferably included in the feed in a range of 0.5 to 5.0 ounces per hundred pounds of feed.

Although pellets are preferred for administration carriers, powdered feeds may also less preferably be utilized.

Although it is preferable to add the above air sac curative composition to the feed, where the fowl will not take feed or nourishment it may be forcibly injected down into the throat of the fowl, either in a water or glycerin carrier or mixed with finely divided food particles serving as a carrier.

In this case a dosage of from 2 to 5 milligrams of the above composition may be administered to the fowl at intervals of every 6 to 8 hours during day periods for 2 or 3 days, during which time the rapid curative effects quickly evidence themselves.

As many changes could be made in the above treatment of air sac disease as it is encountered in domesticated fowl, and many widely different embodiments of this invention could be made without departing from the scope of the claims, it is intended that all matter contained in the above description shall be interpreted as illustrative and not in a limiting sense.

Having now particularly described and ascertained the nature of the invention, and in what manner the same is to be performed, what is claimed is:

1. A process for treating air sac disease in fowl which comprises introducing into the intestinal tract of the bird infected with the causative agent of said disease a poultry feed containing minute amounts of vitamin A and guaiacol.

2. A process for treating air sac disease in fowl which comprises introducing into the intestinal tract of the bird infected with the causative agent of said disease a poultry feed containing vitamin A and guaiacol in an amount of 0.05 to 50 parts by weight per 100 parts by weight of feed.

3. A process for treating air sac disease in fowl which comprises introducing into the intestinal tract of the bird infected with the causative agent of said disease a poultry feed containing the following ingredients, in parts by weight

| | |
|---|---|
| Vitamin A | 1.112 |
| Iodine | 0.166 |
| Camphor | 1.33 |
| Oil of eucalyptus | 1.33 |
| Guaiacol | 1.33 |

4. A process for treating air sac disease in fowl which comprises introducing into the intestinal tract of the bird infected with the causative agent of said disease a poultry feed containing the following ingredients, in parts by weight

| | |
|---|---|
| Vitamin A | 0.222 to 2.78 |
| Iodine | 0.033 to 0.5 |
| Camphor | 0.333 to 2 |
| Oil of eucalyptus | 0.333 to 2 |
| Guaiacol | 0.333 to 2 |

References Cited in the file of this patent

UNITED STATES PATENTS

| | | |
|---|---|---|
| 2,381,830 | Lobel | Aug. 7, 1945 |
| 2,546,895 | Jarowski | Mar. 27, 1951 |
| 2,645,640 | Charpentier | July 14, 1953 |
| 2,802,772 | Elder | Aug. 13, 1957 |
| 2,861,024 | Silver | Nov. 18, 1958 |

OTHER REFERENCES

Lancet, vol. 11, October 19, 1957, pp. 804–5.
Dupont Agri. News Letter, 1957, pp. 3–4.
United States Dept. of Agr. Yearbook, Washington, D.C., 1956, pp. 476–478.
Merck Veterinary Manual, 1955, pp. 1124–6.
Lederle: Control of Poultry Diseases, 1946, page 35.
Winslow et al.: Veterinary Materia Medica, pages 393, 381, 191 (1919).
Remington's Practice of Pharmacy, 1936, page 677.